US010152606B2

(12) United States Patent
Faitelson et al.

(10) Patent No.: US 10,152,606 B2
(45) Date of Patent: *Dec. 11, 2018

(54) ENTERPRISE LEVEL DATA ELEMENT REVIEW SYSTEMS AND METHODOLOGIES

(71) Applicant: VARONIS SYSTEMS, INC., New York, NY (US)

(72) Inventors: Yakov Faitelson, Elkana (IL); Ohad Korkus, Herzeliya (IL); David Bass, Carmei Yoseph (IL); Yzhar Kaysar, Kohav Yair (IL); Ophir Kretzer-Katzir, Reut (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,547

(22) Filed: Feb. 7, 2017

(65) Prior Publication Data
US 2017/0147832 A1    May 25, 2017

Related U.S. Application Data

(63) Continuation of application No. 13/439,258, filed on Apr. 4, 2012, now Pat. No. 9,588,835.

(51) Int. Cl.
G06F 17/30    (2006.01)
G06F 21/62    (2013.01)
(Continued)

(52) U.S. Cl.
CPC ...... G06F 21/6218 (2013.01); G06F 11/0709 (2013.01); G06F 11/0751 (2013.01);
(Continued)

(58) Field of Classification Search
CPC .... G06F 17/30; G06F 21/552; G06F 21/2141; G06F 21/2135; G06F 21/2137; G06F 21/2139
(Continued)

(56) References Cited

U.S. PATENT DOCUMENTS 6,574,630 B1    6/2003    Augustine et al.
6,701,324 B1    3/2004    Cochran et al.
(Continued)

FOREIGN PATENT DOCUMENTS

EP    1248178 B1    1/2004

OTHER PUBLICATIONS

Edgar Weippel, et al; "Content-based Management of Document Access Control", 14th International Conference on Applications of Prolog (INAP), 2001.
(Continued)

Primary Examiner — Vincent F Boccio
(74) Attorney, Agent, or Firm — Ladas & Parry LLP

(57) ABSTRACT

An enterprise level data element review system including a data access event collection subsystem operative to collect data access event notifications relating to ones of a multiplicity of data elements, a data element metadata modification subassembly receiving an output from the data access event collection subsystem and providing a script indicating which data elements have had a metadata modification over a given period of time, and a data element dancer operative to collect at least one of metadata and access permissions for a plurality of data elements which is substantially less than the multiplicity of data elements and is selected on the basis of the script.

2 Claims, 3 Drawing Sheets

(51) Int. Cl.
*G06F 21/55* (2013.01)
*G06F 11/07* (2006.01)

(52) U.S. Cl.
CPC ...... *G06F 11/0766* (2013.01); *G06F 11/0772* (2013.01); *G06F 11/0793* (2013.01); *G06F 21/552* (2013.01)

(58) Field of Classification Search
USPC ........................................ 707/783; 726/1, 27
See application file for complete search history.

(56) References Cited

U.S. PATENT DOCUMENTS

| | | | |
|---|---|---|---|
| 7,444,655 B2 | 10/2008 | Sardera | |
| 7,555,482 B2 | 6/2009 | Korkus | |
| 7,596,571 B2 | 9/2009 | Sifry | |
| 7,606,801 B2 | 10/2009 | Faitelson et al. | |
| 7,644,351 B1 | 1/2010 | Portnoy et al. | |
| 7,653,836 B1 | 1/2010 | Chatterjee et al. | |
| 7,806,759 B2 * | 10/2010 | McHale | A63F 13/10 84/610 |
| 7,966,644 B2 * | 6/2011 | Noda | G06F 21/6218 726/27 |
| 8,255,386 B1 * | 8/2012 | Annau | G06F 17/3089 707/711 |
| 8,453,159 B2 | 5/2013 | Appelbaum et al. | |
| 9,177,167 B2 * | 11/2015 | Faitelson | G06F 17/30082 |
| 9,588,835 B2 | 3/2017 | Faitelson et al. | |
| 2002/0144142 A1 | 10/2002 | Shohat | |
| 2003/0153991 A1 | 8/2003 | Visser et al. | |
| 2004/0123183 A1 | 6/2004 | Tripathi et al. | |
| 2005/0255914 A1 * | 11/2005 | McHale | A63F 13/10 463/31 |
| 2007/0005665 A1 | 1/2007 | Vaitzblit et al. | |
| 2007/0244899 A1 | 10/2007 | Faitelson et al. | |
| 2007/0271592 A1 * | 11/2007 | Noda | H04L 9/3234 726/1 |
| 2008/0115076 A1 | 5/2008 | Frank et al. | |
| 2008/0172720 A1 | 7/2008 | Botz et al. | |
| 2008/0271157 A1 | 10/2008 | Faitelson et al. | |
| 2008/0301175 A1 | 12/2008 | Applebaum et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0265780 A1 | 10/2009 | Korkus et al. | |
| 2010/0179940 A1 | 7/2010 | Gilder et al. | |
| 2010/0180349 A1 | 7/2010 | Koohgoli et al. | |
| 2011/0010758 A1 | 1/2011 | Faitelson et al. | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0184989 A1 | 7/2011 | Faitelson et al. | |
| 2011/0296490 A1 | 12/2011 | Faitelson et al. | |
| 2012/0054283 A1 | 3/2012 | Korkus et al. | |
| 2012/0084595 A1 | 4/2012 | Dutch et al. | |
| 2012/0191646 A1 | 7/2012 | Faitelson et al. | |
| 2012/0221550 A1 | 8/2012 | Korkus et al. | |
| 2013/0227352 A1 | 8/2013 | Kumarasamy et al. | |
| 2013/0246477 A1 | 9/2013 | Faitelson et al. | |
| 2013/0268562 A1 | 10/2013 | Faitelson et al. | |
| 2013/0346170 A1 * | 12/2013 | Epstein | G06Q 30/02 705/14.14 |
| 2014/0101495 A1 | 4/2014 | Faitelson et al. | |
| 2015/0227933 A1 | 8/2015 | Serebrennikov | |

OTHER PUBLICATIONS

Extended European Search Report dated May 23, 2016; Appl. No. 12873556.0.
First Chinese Office Action dated Aug. 2, 2016; Appln. No. 2012800736156.
German Office Action dated Sep. 14, 2012 Appln. No. 11 2006 001 378.5 (In English).
International Search Report and Written Opinion dated Sep. 21, 2012; Appln. PCT/IL2012/000147.
USPTO NFOA dated Sep. 14, 2012 in connection with U.S. Appl. No. 12/861,967.
USPTO RR dated Oct. 29, 2013 in connection with U.S. Appl. No. 13/439,258.
USPTO NFOA dated Mar. 24, 2014 in connection with U.S. Appl. No. 13/439,258.
USPTO FOA dated Jan. 16, 2015 in connection with U.S. Appl. No. 13/439,258.
USPTO AA dated May 1, 2015 in connection with U.S. Appl. No. 13/439,258.
USPTO NFOA dated Mar. 17, 2016 in connection with U.S. Appl. No. 13/439,258.
USPTO NOA dated Oct. 24, 2016 in connection with U.S. Appl. No. 13/439,258.
USPTO FOA dated Jul. 10, 2014 in connection with U.S. Appl. No. 13/439,276.
USPTO NOA dated Oct. 16, 2015 in connection with U.S. Appl. No. 13/439,276.
USPTO NFOA dated Aug. 1, 2014 in connection with U.S. Appl. No. 14/101,883.
USPTO FOA dated Feb. 11, 2015 in connection with U.S. Appl. No. 14/101,883.
USPTO AA dated May 21, 2015 in connection with U.S. Appl. No. 14/101,883.
USPTO NFOA dated Jul. 13, 2016 in connection with U.S. Appl. No. 14/101,883.
USPTO FOA dated Mar. 8, 2017 in connection with U.S. Appl. No. 14/101,883.
USPTO AA dated Jun. 28, 2017 in connection with U.S. Appl. No. 14/101,883.
USPTO NOA dated Sep. 26, 2018 in connection with U.S. Appl. No. 14/101,883.

* cited by examiner

ENTERPRISE LEVEL DATA ELEMENT REVIEW SYSTEMS AND METHODOLOGIES

REFERENCE TO RELATED APPLICATIONS

Reference is made to the following patents and patent applications, owned by assignee, the disclosures of which are hereby incorporated by reference:

U.S. Pat. Nos. 7,555,482 and 7,606,801;

U.S. Published Patent Application Nos.: 2007/0244899, 2008/0271157, 2009/0100058, 2009/0119298; 2009/0265780; 2011/0010758; 2011/0060916; 2011/0061093, 2011/0061111, 2011/0184989, 2011/0296490 and 2012/0054283; and U.S. patent application Ser. Nos.: 13/106,023; 13/159,903; and 13/303,826.

FIELD OF THE INVENTION

The present invention relates generally to enterprise level data element review systems and methodologies.

BACKGROUND OF THE INVENTION

The following publications are believed to represent the current state of the art:

U.S. Pat. Nos. 7,555,482 and 7,606,801; and

U.S. Published Patent Application Nos.: 2011/0060916, 2011/0061111 and 2011/0296490.

SUMMARY OF THE INVENTION

The present invention seeks to provide enterprise level data element review systems and methodologies.

There is thus provided in accordance with a preferred embodiment of the present invention an enterprise level data element review system including a data access event collection subsystem operative to collect data access event notifications relating to ones of a multiplicity of data elements, a data element metadata modification subassembly receiving an output from the data access event collection subsystem and providing a script indicating which data elements have had a metadata modification over a given period of time, and a data element dancer operative to collect at least one of metadata and access permissions for a selected plurality of data elements which is substantially less than the multiplicity of data elements and is selected on the basis of the script.

There is also provided in accordance with another preferred embodiment of the present invention an enterprise level data element review system including a data access event collection subsystem operative to collect data access event notifications relating to ones of a multiplicity of data elements, a data element modified metadata collector which is operative to collect at least one of metadata and access permissions for a plurality of data elements which is substantially less than the multiplicity of data elements, and a data element crawler operative to crawl over the multiplicity of data elements thereby to collect at least one of metadata and access permissions for the multiplicity of data elements.

There is also provided in accordance with another preferred embodiment of the present invention an enterprise level data element review system including a data access event collection failure monitoring subsystem operative to ascertain failure to collect data access events and to provide a failure notification, and a data element crawler operative in response to receipt of the failure notification to crawl over the multiplicity of data elements thereby to collect at least one of metadata and access permissions for the multiplicity of data elements.

There is also provided in accordance with another preferred embodiment of the present invention a method for enterprise level data element review including collecting data access event notifications relating to ones of a multiplicity of data elements, providing a script indicating which data elements have had a metadata modification over a given period of time, and collecting at least one of metadata and access permissions for a selected plurality of data elements which is substantially less than the multiplicity of data elements and is selected on the basis of the script.

There is also provided in accordance with another preferred embodiment of the present invention a method for enterprise level data element review including collecting data access event notifications relating to ones of a multiplicity of data elements collecting at least one of metadata and access permissions for a plurality of data elements which is substantially less than the multiplicity of data elements, and crawling over the multiplicity of data elements thereby to collect at least one of metadata and access permissions for the multiplicity of data elements.

There is also provided in accordance with another preferred embodiment of the present invention a method for enterprise level data element review including ascertaining failure to collect data access events, providing a failure notification, and in response to receipt of the failure notification, crawling over the multiplicity of data elements thereby to collect at least one of metadata and access permissions for the multiplicity of data elements.

BRIEF DESCRIPTION OF THE DRAWINGS

The present invention will be understood and appreciated more fully from the following detailed description taken in conjunction with the drawing in which.

DETAILED DESCRIPTION OF PREFERRED EMBODIMENTS

Figure 1:
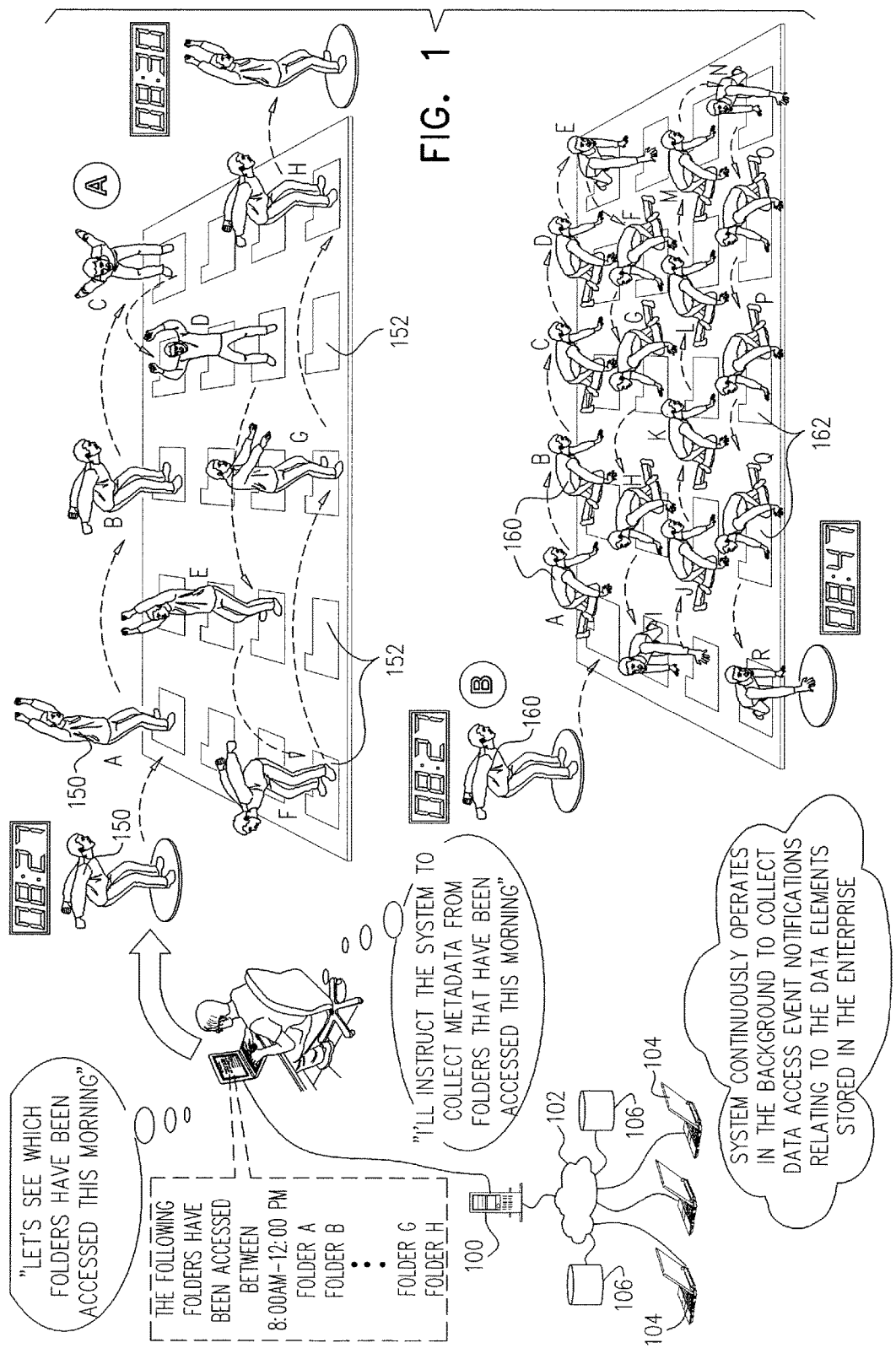
FIG. 1 is a simplified illustration of an enterprise level data element review system constructed and operative in accordance with a preferred embodiment of the invention.

Reference is now made to FIG. 1, which is a simplified illustration of an enterprise level data element review system constructed and operative in accordance with a preferred embodiment of the invention. The system of FIG. 1 is preferably suitable for operating in an enterprise computer network which includes, inter alia, multiple disparate servers and clients storing data elements such as files and folders.

The system of FIG. 1 preferably includes a data access event collection subsystem operative to collect data access event notifications relating to ones of a multiplicity of data elements, a data element metadata modification subassembly receiving an output from the data access event collection subsystem and providing a script indicating which data elements have had a metadata modification over a given period of time, and a data element dancer operative to collect at least one of metadata and access permissions for a selected plurality of data elements which is substantially less than the multiplicity of data elements and is selected on the basis of the script.

As shown in FIG. 1, the system resides on a server 100 which is connected to a computer network 102 to which are connected a plurality of computer servers 104 and storage devices 106, and preferably continuously operates in the background to collect data access event notifications relating to the multiplicity of data elements stored on servers 104 and storage devices 106.

As further shown in FIG. 1, an administrator of the system wishes to utilize the system to collect metadata of folders that were modified during a particular period of time, such as between 8 AM-12 PM on Jan. 5, 2012. Responsive to a request from the administrator, the system provides the administrator with a script 120 which comprises a list of folders which have been accessed during the period of interest. Thereafter, the administrator instructs the system to collect metadata of the folders which appear in the script.

It is a particular feature of the present invention that continuous collection of data access event notifications by the system is operative to enable efficient maintaining of a generally up-to-date collection of metadata of all data elements by periodically selectively collecting metadata only of data elements which are known to have been accessed during a particular period of time. It is appreciated that the time and computer resources needed to periodically selectively collect metadata only from data elements which are known to have been accessed during a particular period of time is substantially less than the time needed to collect metadata from all data elements.

This particular feature is further illustrated in FIG. 1. As shown in option A, a data element dancer 150 begins to dance through a plurality of data elements 152 at 8:27 AM. As clearly shown in the illustration of option A, as dancer 150 dances through data elements 152, he lands on only a subset of data elements 152 which correspond to data elements listed in script 120, and completes dancing over data elements 152 at 8:30 AM.

Contrarily, as illustrated in option B, a data element crawler 160 begins to crawl through a plurality of data elements 162 at 8:27 AM., however, as crawler 160 crawls through data elements 162, he lands on every one of data elements 162, thereby completing to crawl over data elements 162 at 8:47 AM., significantly later than data element dancer 150.

It is appreciated that the system also comprises a data access event collection failure monitoring subsystem operative to ascertain failure to collect data access events and to provide a corresponding failure notification to a data element crawler which is operative in response to receipt of the failure notification to crawl over the multiplicity of data elements stored on servers 104 and storage devices 106 and to thereby collect at least one of metadata and access permissions for the multiplicity of data elements.

Figure 2:
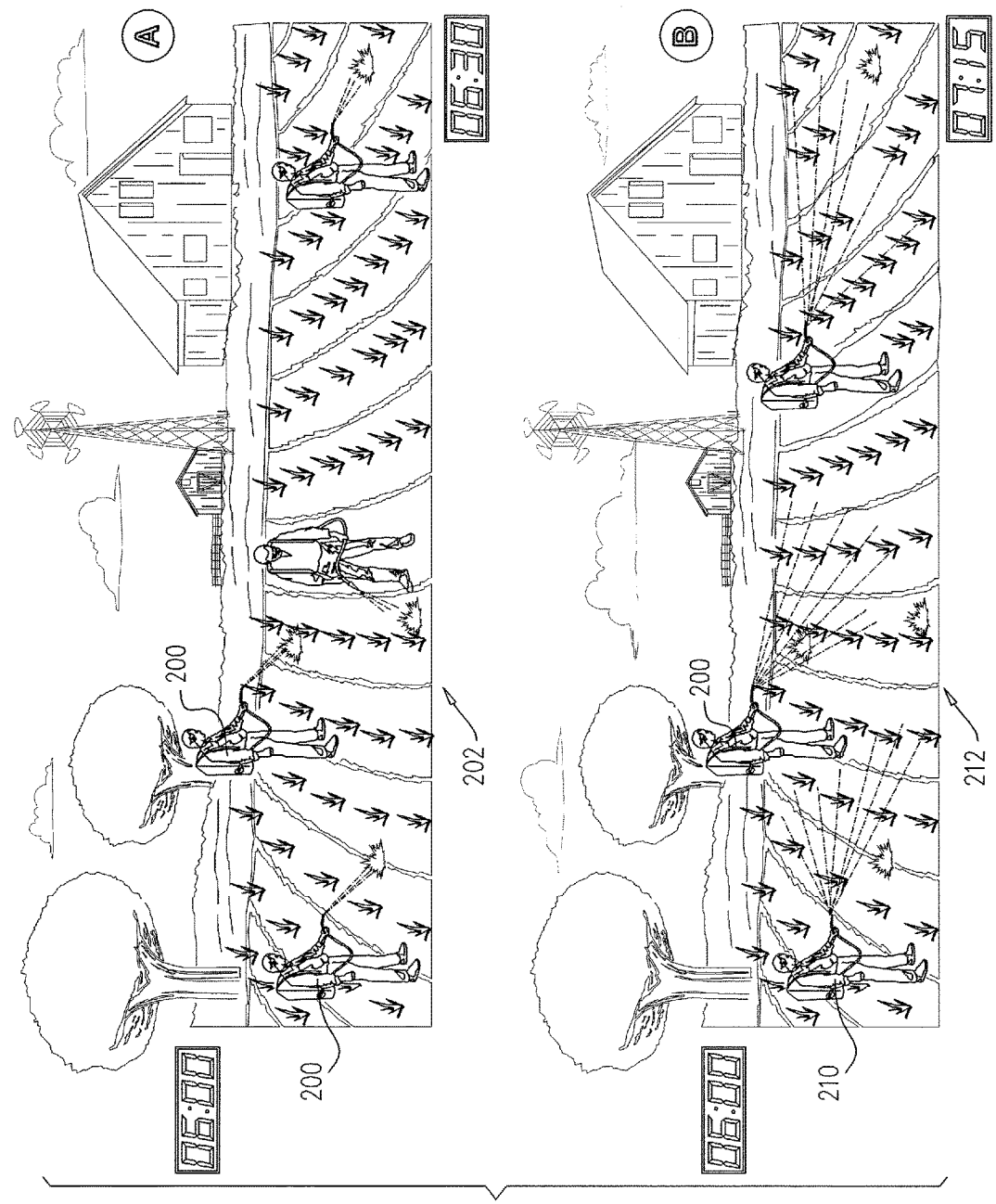
FIG. 2 is an alternative simplified illustration of the enterprise level data element review system of FIG. 1.

Reference is now made to FIG. 2, which is an alternative simplified illustration of the enterprise level data element review system of FIG. 1. FIG. 2 further illustrates the particular feature of the present invention, whereby initially ascertaining which particular elements of a group need to be treated and thereafter selectively treating only those particular elements is substantially more efficient than treating all the elements of the group.

As shown in option A of FIG. 2, a first pesticide applicator 200 begins to walk through the rows of a planted field 202 at 6:00 AM. As clearly shown in the illustration of option A, as pesticide applicator 200 walks through field 202, he applies pesticide only to plants which have been identified as being infested, and completes walking through the entire filed at 6:30 AM.

Contrarily, as illustrated in option B, a second pesticide applicator 210 begins to walk through the rows of a planted field 212 at 6:00 AM., however as second pesticide applicator 210 walks through field 212 he applies pesticide to every one of the plants of field 212 regardless of whether they are infested or not, thereby completing to walk through the field at 7:15 AM, significantly later than first pesticide applicator 200.

Figure 3:
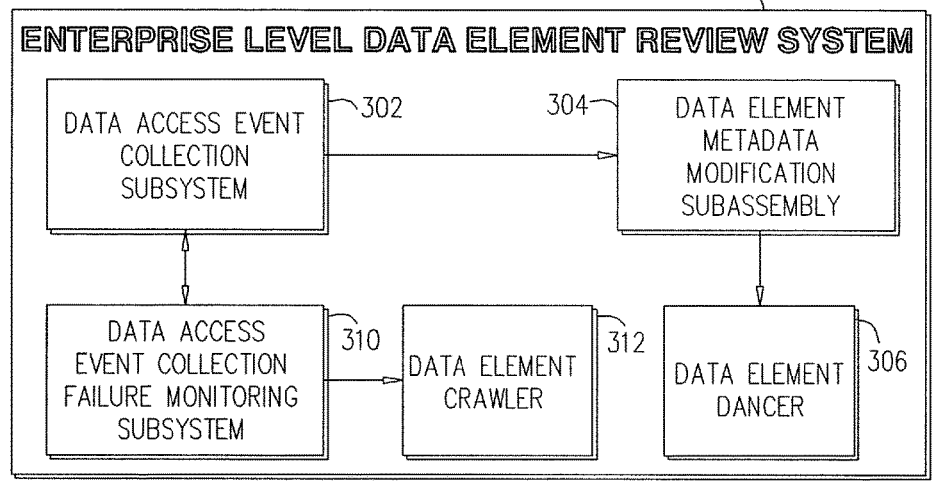
FIG. 3 is a simplified block diagram illustration of the system and methodology of FIG. 1.
Figure 4:
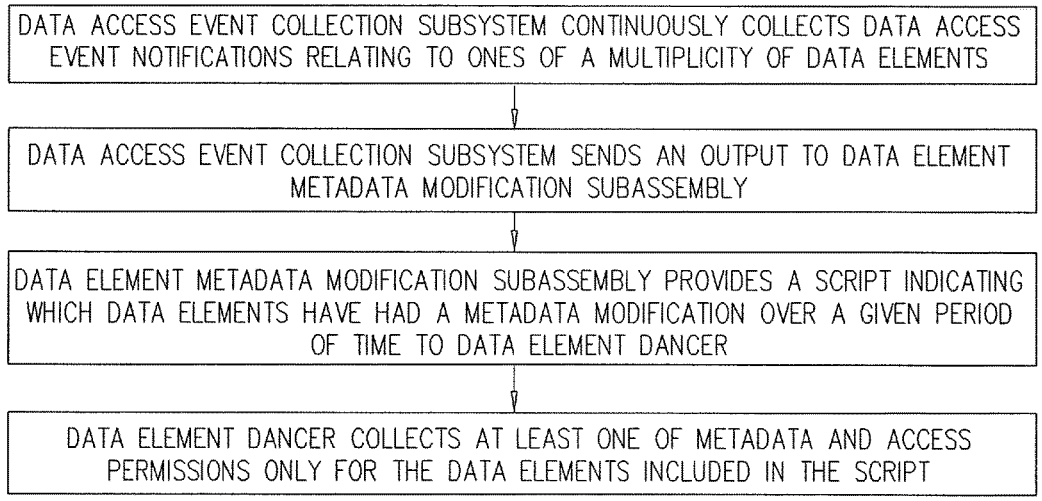
FIG. 4 is a simplified block diagram illustration of the operation of the system of FIG. 1.
Figure 5:
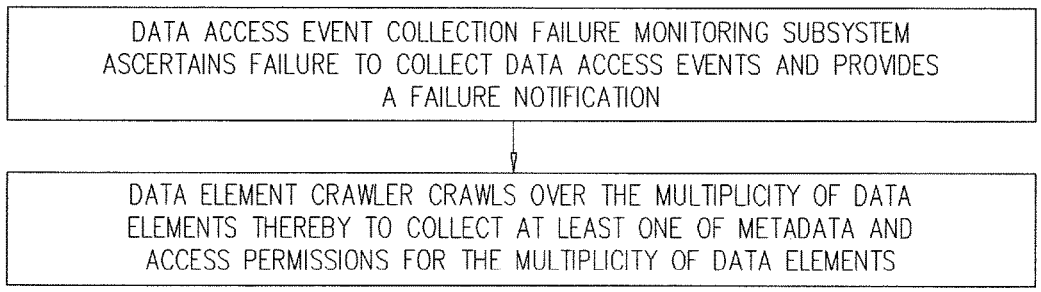
FIG. 5 is a simplified block diagram illustration of another aspect of the use of the system of FIG. 1.

Reference is now made to FIG. 3, which is a simplified block diagram illustration of the system of FIG. 1, to FIG. 4, which is a simplified block diagram illustration of the operation of the system of FIG. 1, and to FIG. 5, which is a simplified block diagram illustration of another aspect of the use of the system of FIG. 1.

As shown in FIG. 3, the enterprise level data element review system 300 comprises a data access event collection subsystem 302 operative to collect data access event notifications relating to ones of a multiplicity of data elements and to communicate with a data element metadata modification subassembly 304. Data element metadata modification subassembly 304 preferably communicates with a data element dancer 306.

System 300 also includes a data access event collection failure monitoring subsystem 310 operative to ascertain failure of data access event collection subsystem 302 to collect data access events and to provide a corresponding failure notification to a data element crawler 312 which is operative in response to receipt of the failure notification to crawl over the multiplicity of data elements stored in the enterprise and to thereby collect at least one of metadata and access permissions for the multiplicity of data elements.

As shown in FIG. 4, data access event collection subsystem 302 continuously collects data access event notifications relating to ones of a multiplicity of data elements and sends an output to data element metadata modification subassembly 304. Data element metadata modification subassembly 304 preferably provides a script indicating which data elements have had a metadata modification over a given period of time to data element dancer 306 which then collects at least one of metadata and access permissions only for the data elements included in the script.

As shown in FIG. 5, data access event collection failure monitoring subsystem 310 ascertains failure to collect data access events and provides a failure notification. Responsive to the failure notification, data element crawler 312 preferably crawls over the multiplicity of data elements thereby to collect at least one of metadata and access permissions for the multiplicity of data elements.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system comprising a non-transitory, tangible computer-readable medium in which computer program instructions are stored, which instructions, when read by a computer, cause the computer to eliminate unnecessary access permissions in an enterprise computer network having multiple platforms, the system comprising:

monitoring and collection functionality for obtaining continuously updated information regarding at least one of access permissions and actual usage relating to ones of a multiplicity of data elements across an enterprise computer network having multiple platforms;

entitlement review by owner functionality operative to present to at least one owner of at least one data element a visually sensible indication of authorization status, and to require said at least one owner to confirm or modify said authorization status;

a data access event collection subsystem operative to continuously collect data access event notifications relating to ones of said multiplicity of data elements;

a data element metadata modification subassembly receiving an output from said data access event collection subsystem and from said entitlement review by owner functionality, and indicating which of said multiplicity of data elements have had an authorization status thereof modified by said at least one owner and have had a metadata modification over a given period of time; and a data element dancer operative to collect metadata of only said data elements which have had an authorization status modification and a metadata modification over a given period of time.

2. A method for eliminating unnecessary access permissions in an enterprise computer network comprising employing a non-transitory, tangible computer-readable medium in which computer program instructions are stored, which instructions, when read by a computer, cause the computer to:

obtain continuously updated information regarding at least one of access permissions and actual usage relating to ones of a multiplicity of data elements across an enterprise computer network having multiple platforms;

present to at least one owner of at least one data element a visually sensible indication of authorization status, and to require said at least one owner to confirm or modify said authorization status;

continuously collect data access event notifications relating to ones of said multiplicity of data elements;

indicate which of said multiplicity of data elements have had an authorization status thereof modified by said at least one owner and have had a metadata modification over a given period of time; and collect metadata of only said data elements which have had an authorization status modification and a metadata modification over a given period of time.

* * * * *